UNITED STATES PATENT OFFICE 2,492,488

MOLDING MATERIAL AND METHOD OF PREPARING SAME

Henry Kremer, London, England

No Drawing. Application January 20, 1947, Serial No. 723,197
In Great Britain July 1, 1940

10 Claims. (Cl. 117—100)

The invention relates to moulding materials and provides a moulding material comprising a powdered mouldable plastic material of which the particles are coated with a layer of a different mouldable plastic material so that, in effect, the powdered moulding material serves as an "active" filler for the coating material and the properties of both materials may be combined in the moulded product. Preferably the combined material is in the form of a moulding powder, although it may, if desired, be produced in the form of sheets, blocks or pellets.

The invention includes the method of preparing the composite moulding material which consists in applying to the particles of a powdered active filler comprising a mouldable plastic material, a coating of a different mouldable plastic material, the application of the coating being effected by treating the powder with a solution, dispersion or emulsion of the coating material, and then drying off the liquid medium.

In one form of the invention the active filler is a mouldable rubber powder and the coating liquid comprises a solution of a synthetic resin of the thermo-plastic or thermo-setting type. Preferably the mouldable rubber powder comprises an inert filler such as wood flour, sawdust, wood chips, cork or fibrous material and a mixture of natural rubber, reclaimed rubber or synthetic rubber (e. g. polymerised chloroprene), casein or like protein material (e. g. soya bean) and albumen, preferably in the form of blood albumen, said mixture being deposited on the surfaces of the inert filler.

The liquid medium in which the coating material is dissolved or suspended should be such that it has no substantial solvent action on the active filler.

The thermo-setting synthetic resin may comprise a solution, preferably an aqueous solution, of a urea-formaldehyde, thiourea-formaldehyde, resorcinol-formaldehyde or phenol formaldehyde condensation product. When using natural rubber, a latex having a dry rubber content of 30—60% may be employed together with appropriate amounts of any known vulcanizing agents, accelerators and anti-oxidants. As a vulcanizing agent, 1% of sulphur in the form of a 50% aqueous colloidal dispersion may be used. The choice of accelerator is naturally dependent on the process of manufacture of the composite moulding powder as described in the example given below. However, the accelerator must not bring about vulcanization of the latex during the drying process (i. e. below 100° F.) nor must it show spontaneous vulcanization in the latex mix, which may be stored for some weeks. On the other hand, the accelerator or accelerators chosen must bring about fairly rapid vulcanization of a temperature such as 280° F. as for instance during the pressing operation described in the example. As examples of water-soluble accelerators which may be used, diethylammonium diethyldithiocarbamate or piperidine pentamethylene dithiocarbamate are mentioned. Alternatively, aqueous dispersions of water-insoluble accelerating agents such as zinc diethyldithiocarbamate ("ZDC"), or mercaptobenzothiazole ("MBT"), or dibenzothiazyldisulphide, may be used. The preferred quantity of accelerators to be used is dependent on the particular agent or agents employed, but 0.75% to 1.5% accelerator (based on the weight of dry rubber) will normally be sufficient. Other desirable ingredients which are added to the latex may include an anti-oxidant such as 1% of phenyl β-napthylamine and/or 1 to 5% of an activator such as zinc oxide and/or 1 to 5% of a stabilizer such as casein or a sulphonated fatty alcohol.

One example of the preparation of a composite moulding powder according to the invention will now be described.

Example 1

In this example the following constituents A, B, C, D, E and F were first prepared in the manner indicated:

A. 40 lbs. of sawdust, wood flour, wood chips or shavings, fibrous material or other known filler.

B. 2½ lbs. of casein 80–90 mesh was added to 7½–10 lbs. of water, thoroughly mixed together in a mixing machine and left standing for 10 minutes to allow the casein to absorb the water. Then 6.4 ozs. of calcium hydroxide mixed with a small quantity of water was incorporated.

C. 5 lbs. of soluble blood albumen, 8–12 lbs. of water, 4.4 ozs. of ammonium hydroxide (sp. gr. 0.90), 16 ozs. of formaldehyde (30%). The blood albumen was allowed to soak in the water for 2 hours–3 hours prior to stirring. The ammonium hydroxide was then added, still stirring. Then the formaldehyde was carefully added (a strong rapid mixing should be used). This mixture thickens to a strong jelly, but it will become fluid again in an hour or two.

D. A rubber latex mix was compounded from the following:

| | | |
|---|---|---|
| 60% rubber latex | pounds | 10 |
| 50% "ZDC" dispersion | ounces | 3 |
| 50% sulphur dispersion | do | 6 |
| 50% zinc oxide dispersion | do | 6 | by thoroughly incorporating the constituents in a mixing machine of the Werner-Pfleiderer type. To the resultant dispersion was added 12 lbs. of a protective colloid in the form of a 10% borated casein glue "solution." (Alternatively, a 10% "solution" of casein glue as in mix "B" may be used.)

E. 21 lbs. 5 ozs. of a 10% ammonia alum solution (in hot water) or other suitable known coagulant.

F. 20 lbs. of "Resin 425," manufactured by Imperial Chemical Industries Ltd., being a 50% aqueous solution of a phenol-formaldehyde type of condensation product, the condensation being taken merely to the stage whereby the product remains water-soluble.

The filler A was first placed in a mixing machine (of the kind normally used in dough mixing) fitted with an agitator, and during continued agitation of the filler the constituents B, C and D were slowly added in turn. Agitation was continued until the filler was completely wetted by the constituents. The coagulant E was then incorporated while stirring of the mixture was continued. The mixture was then dried in a current of warm dry air at a temperature of 80–90° F. until the moisture content of the mixture was reduced to 10–14%. The solution F was now thoroughly incorporated with the mixture in order effectively to coat all the particles with the resin solution. The mixture was then dried, as before in a current of warm air at 80–90° F., the drying process being carried to an extent such that the moisture content of the mixture was reduced to 5–10%. In both drying operations a rotating drum device was used, this being preferable in order to prevent the particles of the filler adhering together while drying.

The dried powder may be moulded in a manner similar to that adopted with the usual phenolic resin moulding powders. A known mould lubricant such as aluminum stearate may be incorporated in the mix, or alternatively, the mould may be lubricated with such a lubricant. Conveniently the moulding is carried out in a hot press at a temperature of 260–320° F. and a pressure of 400 lbs. to one ton per square inch. The curing time is approximately 1¼ minutes per millimetre of thickness. For flat objects such as panels, a pressure at the lower range may be sufficient, while for articles of irregular shape a moulding pressure of up to one ton per square inch or even higher may be desirable. The moulding powder, prior to moulding, may be pelletted in the usual manner.

It is understood that one or more of the bonding agents referred to above (Example 1) may be omitted or varied or they may be increased or decreased at will in order that the properties of any one bonding agent may predominate or be suppressed in the finished moulding.

Thus, although in the foregoing example, the dry weights of casein, blood albumen, rubber and phenolic resin, expressed as a percentage of the weight of filler, are respectively 6.25%, 12.5%, 15% and 25%, these relative proportions may be varied as indicated by further examples as follows:

Example 2

A composite mix may be prepared whereby the percentage rubber in mix D is increased to 25%, with a corresponding increase in the quantity of coagulant (E) and with a simultaneous decrease in the case of mix F from 25% to 5%.

In such an example, the properties of natural rubber (e. g., flexibility) will predominate in the final moulding.

Example 3

As an alternative, a composite mix may be prepared whereby the quantity of resin used (mix F) is increased to 30% and the percentage of natural rubber is reduced to 5% thus allowing the production of moulded panels or articles in which the hardness, glossy finish and other properties associated with synthetic resins predominate.

Whilst the above special method of preparing moulding powders is preferred, it is to be noted that mix B and mix C may be omitted altogether, so that a moulding powder is then prepared by applying successive coatings of rubber or some synthetic rubber-like material, and a synthetic resin of the thermosetting group. However, where constituents B and C are included in the composite mix, it is preferable that the casein should be in the form of a heat-reactive casein glue which may contain hardening and insolubilizing agents.

Similarly, it is preferred that the albumen should be in the form of a heat-reactive blood albumen glue likewise containing hardening and insolubilizing agents.

The following examples illustrate mixes wherein the albumen and casein have been omitted:

Example 4

A. As in Example 1.
B. Omitted.
C. Omitted.
D. Using 15% natural rubber (as in Example 1) which is applied as the first coating.
F. Using 25% of a urea-formaldehyde resin solution, applied as the second coating.

Example 5

A. As in Example 1.
B. and C. omitted.
D. Using 10% of a polychloroprene latex.
F. Using 30% of a resorcinol-formaldehyde resin solution.

The amount of water or other liquid in constituents A, B, C and D may be adjusted if required in accordance with the size of the particles of the filler. For a fine filler slightly more liquid will be required to wet all the particles, as against less for coarser particles.

In the foregoing examples the rubber in mix D may consist of a mixtur of latex and a compounded dispersion of reclaimed rubber, or entirely of dispersed reclaimed rubber. It may then be necessary to reduce mix E in proportion to the smaller amount of natural latex used, or mix E may be omitted altogether if no natural latex is used. Also, if a usual compounded dispersion of reclaimed rubber is used and if this already contains the usual protective colloid, there would be less necessity to add a 10% solution of casein. The dispersion of reclaim should have, or be altered to have, a sufficiently low solid content to ensure that all the particles of the inert filler will be effectively wetted by the dispersion.

Again in the foregoing example the rubber in mix D may consist of a mixture of natural rubber latex and a synthetic latex such as polymerised chloroprene (e. g. the form marketed under the trade name "neoprene") or of synthetic latex alone. Where a natural rubber latex is employed, it is preferred that the protective colloid mentioned in mix D should be a 10% ammoniated casein solution.

Any desired colouring matter may be introduced during the manufacture of the composite powder.

It is to be understood that instead of wood any other known form of inert filler may be employed.

The term "coated" used in the following claims is intended to include impregnation as well as merely superficial coating.

This application is a continuation in part of my copending application Serial No. 397,331 filed June 9, 1941 (now abandoned).

Having described my invention, I claim:

1. A method of preparing a dry composite moulding material comprising the steps of completely wetting and coating particles of an inactive organic filler with a liquid containing a rubbery diolefine polymer, drying the thus coated filler, supercoating the dry material with a solution of a synthetic resin from the group consisting of phenol-aldehyde and urea aldehyde resins in heat reactive condition, and drying the synthetic resin coating.

2. A method of preparing a dry composite moulding material comprising the steps of completely coating particles of an inactive organic filler with a liquid containing a rubbery diolefine polymer, together with a vulcanizing agent including sulphur and an accelerator to cooperate therewith inactive at temperatures below about 100° F. but active for effecting vulcanization at temperatures of about 260-320° F., drying the thus coated filler, supercoating the dry material with a solution of a synthetic resin from the group consisting of phenol-aldehyde and urea-aldehyde resins in heat reactive condition, and drying the synthetic resin coating.

3. A method of preparing a dry composite moulding material comprising the steps of mixing with an inactive organic filler an aqueous solution of casein, an aqueous mixture of blood albumen and a rubber latex mixture containing a vulcanizing agent including sulphur and an accelerator to cooperate therewith inactive at temperatures below about 100° F., but active for effecting vulcanization at temperatures of about 260-320° F., and an anti-oxidant, until the filler is wetted with the constituents with which it is mixed, drying the mixture until the moisture content is reduced to about 10-14%, supercoating the dried material by mixing with the same an aqueous solution of a water soluble resin from the group consisting of phenol-aldehyde and urea-aldehyde resins, and drying the supercoated material.

4. A composite moulding material for moulding comprising particles of an inert organic filler completely coated with a dry rubbery diolefine polymer and supercoated with synthetic resin from the group consisting of phenol-aldehyde and urea aldehyde resins in dry and heat reactive condition.

5. A composite moulding material for moulding at temperatures of about 260-320° F., comprising particles of an inert organic filler completely coated with a vulcanizable rubbery diolefine polymer containing a vulcanizer including sulphur and an accelerator to cooperate therewith inactive at temperatures below about 100° F., but effective at temperatures of about 260-320° F. to cause rapid vulcanization of the rubber material, and an anti-oxidant, and a supercoating of a dry synthetic resin in heat reactive condition.

6. A composite moulding material for moulding at temperatures of about 260-320° F. comprising particles of an inert organic filler completely coated with a vulcanizable rubbery diolefine polymer containing a vulcanizer including sulphur and an accelerator to cooperate therewith inactive at temperatures below about 100° F., but effective at temperatures of about 260-320° F. to cause rapid vulcanization of the rubber material, admixed with casein and a coagulant and a supercoating of a dry synthetic resin from the group consisting of phenol-aldehyde and urea-aldehyde resins in heat reactive condition.

7. A method of preparing a dry composite moulding material comprising the steps of completely coating particles of sawdust with a liquid containing a vulcanizable rubbery diolefine polymer together with a vulcanizing agent including sulphur and an accelerator to cooperate therewith inactive at temperatures below about 100° F., but active for effecting vulcanization at temperatures of about 260-320° F., drying the thus coated filler, supercoating the dry material with a solution of a synthetic resin from the group consisting of phenol-aldehyde and urea-aldehyde resins in heat reactive condition, and drying the synthetic resin coating at a temperature of about 80-90° F.

8. A method of preparing a dry composite moulding material comprising the steps of mixing with sawdust an aqueous solution of casein, an aqueous mixture of blood albumen and a rubber latex mixture containing a vulcanizing agent including sulphur and an accelerator to cooperate therewith inactive at temperatures below about 100° F. but active for effecting vulcanization at temperatures of about 260-320° F., until the filler is wetted thoroughly with the constituents with which it is mixed, drying the mixture until the moisture content is reduced to about 10-14%, supercoating the dried material by mixing with the same an aqueous solution of a water soluble synthetic resin from the group consisting of phenol-aldehyde and urea-aldehyde resins, and drying the supercoated material.

9. A composite moulding material for moulding at temperatures of about 260-320° F. comprising particles of sawdust coated completely with a vulcanizable rubbery diolefine polymer containing a vulcanizer including sulphur and an accelerator to cooperate therewith inactive at temperatures below about 100° F. but effective at temperatures of about 260-320° F. to cause rapid vulcanization of the rubbery diolefine polymer, and a supercoating of a dry synthetic resin from the group consisting of phenol-aldehyde and urea-aldehyde resins in heat reactive condition.

10. A composite moulding material for moulding at temperatures of about 260-320° F. comprising particles of sawdust completely coated with a vulcanizable rubbery diolefine polymer containing a vulcanizer including sulphur and an accelerator to cooperate therewith inactive at temperatures below about 100° F. but effective at temperatures of about 260-320° F. to cause rapid vulcanization of the rubbery diolefine polymer, and an anti-oxidant, admixed with casein and coagulant and a supercoating of a dry synthetic resin from the group consisting of phenol-aldehyde and urea-aldehyde resins in heat reactive condition.

HENRY KREMER.

REFERENCES CITED

The following references are of record in the file of this patent:

UNITED STATES PATENTS

| Number | Name | Date |
|---|---|---|
| 1,977,748 | Webster | Oct. 23, 1934 |
| 2,025,432 | Beckwith | Dec. 24, 1935 |
| 2,040,818 | Badollet | May 19, 1936 |
| 2,057,733 | Noble | Oct. 20, 1936 |
| 2,201,321 | Robie | May 21, 1940 |
| 2,250,987 | Dunbar | July 29, 1941 |
| 2,399,655 | Alton | May 7, 1946 |